United States Patent
Tokumo et al.

(10) Patent No.: US 8,139,647 B2
(45) Date of Patent: Mar. 20, 2012

(54) MOVING IMAGE DECODING APPARATUS AND MOVING IMAGE DECODING METHOD

(75) Inventors: Yasuaki Tokumo, Funabashi (JP); Maki Takahashi, Higashi-Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1391 days.

(21) Appl. No.: 11/664,300

(22) PCT Filed: Oct. 21, 2005

(86) PCT No.: PCT/JP2005/019364
§ 371 (c)(1),
(2), (4) Date: Mar. 29, 2007

(87) PCT Pub. No.: WO2006/046476
PCT Pub. Date: May 4, 2006

(65) Prior Publication Data
US 2009/0262837 A1 Oct. 22, 2009

(30) Foreign Application Priority Data
Oct. 29, 2004 (JP) .................................. 2004-316208

(51) Int. Cl.
*H04N 7/12* (2006.01)
*H04N 7/50* (2006.01)
*H04N 11/02* (2006.01)
*H04N 11/04* (2006.01)
*H04N 1/417* (2006.01)
*H04N 7/68* (2006.01)
*H04N 5/21* (2006.01)
*G06K 9/40* (2006.01)

(52) U.S. Cl. ......... 375/240.27; 375/240.12; 375/240.24; 375/240.25

(58) Field of Classification Search ............. 375/240.27, 375/240.24, 240.25
See application file for complete search history.

(56) References Cited

U.S. PATENT DOCUMENTS
5,247,363 A 9/1993 Sun et al.
(Continued)

FOREIGN PATENT DOCUMENTS
EP 0 493 128 A2 7/1992
(Continued)

OTHER PUBLICATIONS

Yue Shi; Xuhui Zhu; Jun Xia; Hanchun Yin; "A Fast and Efficient Spatial Error Concealment for Intra-coded Frames"; Image and Signal Processing, 2008. CISP '08. Congress on vol. 1 Digital Object Identifier: 10.1109/CISP.2008.45; Publication Year: Sep. 2008 , pp. 264-267.*

(Continued)

*Primary Examiner* — Eleni Shiferaw
*Assistant Examiner* — Courtney Fields
(74) *Attorney, Agent, or Firm* — Birch, Stewart, Kolasch & Birch, LLP

(57) ABSTRACT

Moving image decoding apparatus and moving image decoding method wherein the picture quality degradation is small even when an error occurs in decoding or the like in an coding system that refers to more than one frames to perform a prediction coding. An error correcting part (6) comprises an image selecting part ($6_1$) and an error concealing part ($6_2$). The image selecting part ($6_1$) selects a frame to be used as the image for the concealment and notifies the error concealing part ($6_2$) of, as information of the selected frame, the frame number (frame_num) of the selected image or the number of a frame memory in which the selected image is stored. The error concealing part ($6_2$) uses additional information and the selected frame information which is given from the image selecting part ($6_1$) to conceal the macro block where the error has occurred.

5 Claims, 10 Drawing Sheets

U.S. PATENT DOCUMENTS

| | | | |
|---|---|---|---|
| 5,614,958 A | 3/1997 | Shikakura | |
| 5,717,705 A | 2/1998 | Shikakura et al. | |
| 5,809,041 A | 9/1998 | Shikakura et al. | |
| 5,912,707 A | 6/1999 | Kim | |
| 6,304,990 B1 | 10/2001 | Shikakura et al. | |
| 6,404,817 B1 * | 6/2002 | Saha et al. | 375/240.27 |
| 6,665,345 B1 * | 12/2003 | Sekiguchi et al. | 375/240.25 |
| 2005/0111557 A1 * | 5/2005 | Kong et al. | 375/240.27 |
| 2006/0227878 A1 * | 10/2006 | Mori et al. | 375/240.24 |
| 2008/0267298 A1 * | 10/2008 | Morimoto et al. | 375/240.27 |

FOREIGN PATENT DOCUMENTS

| | | |
|---|---|---|
| JP | 2-254837 A | 10/1990 |
| JP | 5-153574 A | 10/1990 |
| JP | 3-46481 A | 2/1991 |
| JP | 4-79689 A | 3/1992 |
| JP | 04-252689 A | 9/1992 |
| JP | 5-103313 A | 4/1993 |
| JP | 5-153574 A | 6/1993 |
| JP | 5-292488 A | 11/1993 |
| JP | 6-20050 A | 1/1994 |
| JP | 6-70306 A | 3/1994 |
| JP | 6-133288 A | 5/1994 |
| JP | 6-162693 A | 6/1994 |
| JP | 6-182893 | 6/1994 |
| JP | 7-79441 A | 3/1995 |
| JP | 08-149474 A | 6/1996 |
| JP | 8-181998 A | 7/1996 |
| JP | 8-256333 A | 10/1996 |
| JP | 09-093589 A | 4/1997 |
| JP | 9-187016 A | 7/1997 |
| JP | 2005-303487 A | 10/2005 |
| WO | WO 9716016 A1 * | 5/1997 |

OTHER PUBLICATIONS

Gennari et al., "A robust H.264 Decoder with Error Concealment Capabilities," XII European Signal Processing Conference EUSIP CO, pp. 649-652. Vienna, Austria, Sep. 6, 2004. Retrieved on Jan. 22, 2004: URL:http://www.eurasip.org/Proceedings/Eusipco/Eusipco2004/defevent/papers/cr1155.pdf.

Sun et al., "Error concealment algorithms for robust decoding of MPEG compressed video," Signal Processing: Image Communication, vol. 10, No. 4, pp. 249-269, Amsterdam, NL, Sep. 1, 1997.

Xu et al., "Refined Video Error Concealment over Wireless IP Network." Proceedings of the IEEE 6th Circuits and Systems Symposium on Emerging Technologies: Frontiers of Mobile and Wireless Communication. vol. 1. pp. 257-260, May 31, 2004.

\* cited by examiner

FIG.2
(A)
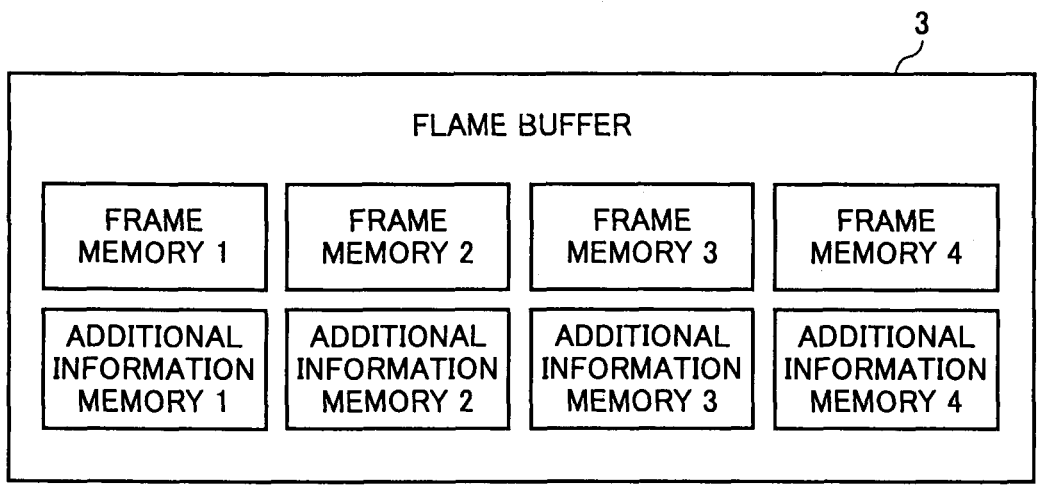
(B)
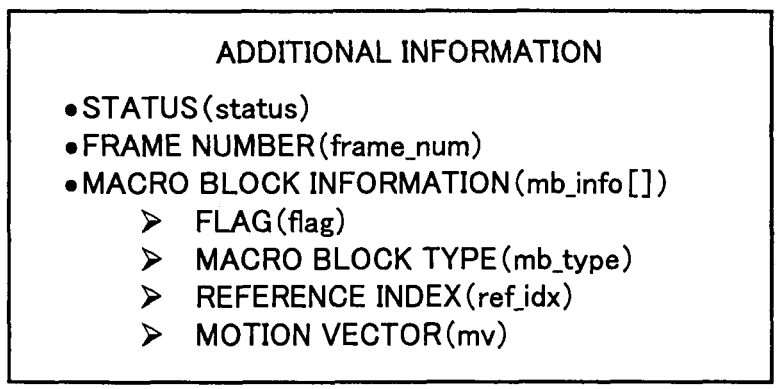

| REFERENCE INDEX (ref_idx) | REFERENCE IMAGE |
|---|---|
| 0 | FRAME P3 |
| 1 | FRAME P2 |
| 2 | FRAME I1 |

(B)

| REFERENCE INDEX (ref_idx) | REFERENCE IMAGE |
|---|---|
| 0 | FRAME I1 |
| 1 | FRAME P3 |
| 2 | FRAME P2 |

FIG.4
(A)
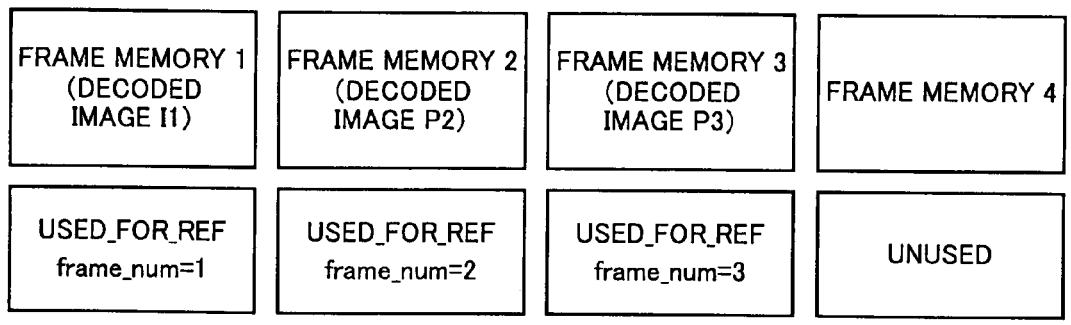
(B)
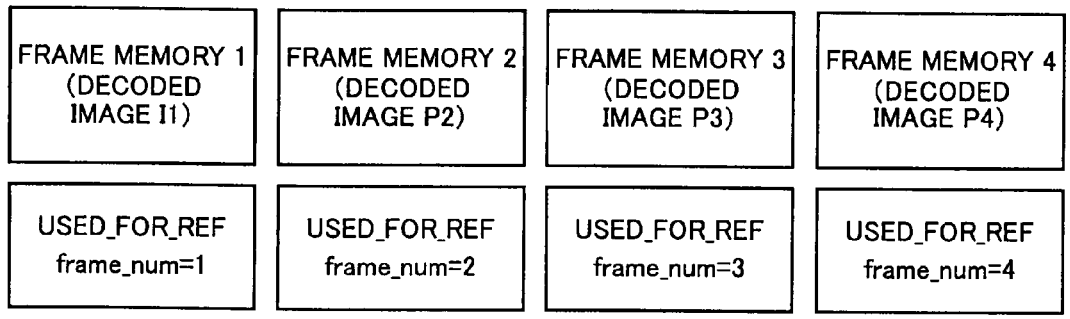
(C)
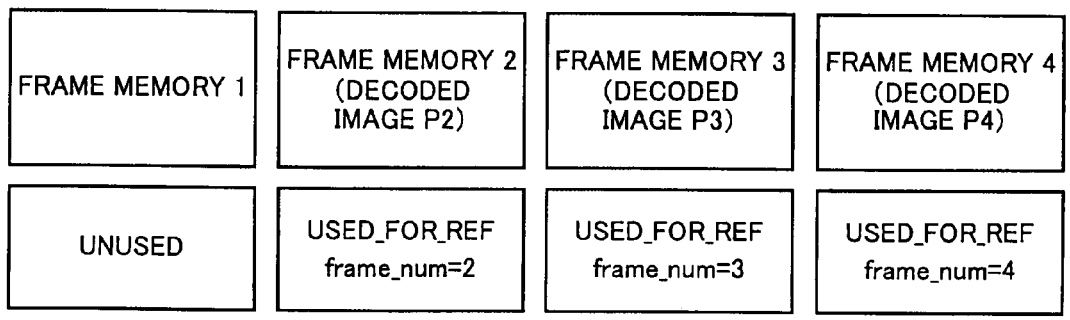

FIG.5

| 0 | 0 | 0 | 0 | 0 | 0 | 2 | 2 | 2 | 2 | 2 |
|---|---|---|---|---|---|---|---|---|---|---|
| 0 | 0 | 0 | 0 | 0 | 0 | 0 | 2 | 2 | 2 | 2 |
| 0 | 0 | 0 | 0 | 0 | 0 | 0 | 0 | 0 | 2 | 2 |
| 0 | 0 | 1 | 1 | 0 | 1 | 1 | 0 | 0 | 0 | 0 |
| 0 | 1 | E | E | E | E | E | 0 | 0 | 0 | 0 |
| 0 | 0 | 1 | 1 | 1 | 1 | 1 | 1 | 0 | X | 0 |
| 0 | 0 | 0 | 1 | 0 | 0 | 0 | X | X | 0 | 0 |
| 0 | 0 | 0 | 0 | 0 | 0 | X | X | 0 | 0 | 0 |
| 0 | 0 | 0 | 0 | 0 | 0 | 0 | 0 | 0 | 0 | 0 |

E : ERROR MACRO BLOCK
X : INTRA-MACRO BLOCK
0 : INTER-MACRO BLOCK(ref_idx = 0)
1 : INTER-MACRO BLOCK(ref_idx = 1)
2 : INTER-MACRO BLOCK(ref_idx = 2)

FIG.9
(A)
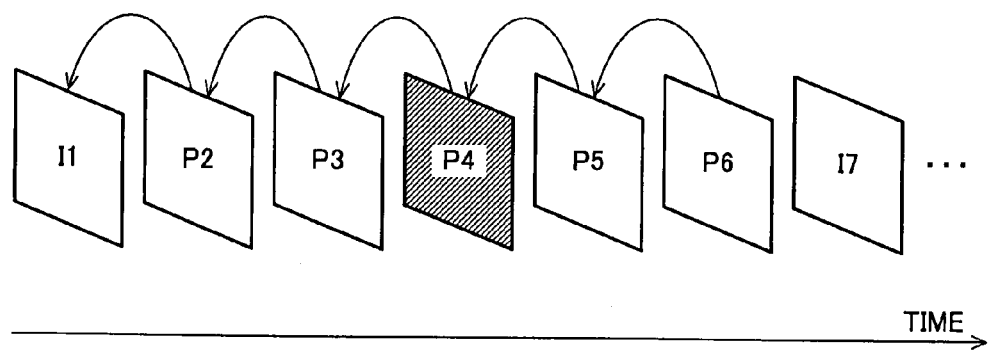
(B)
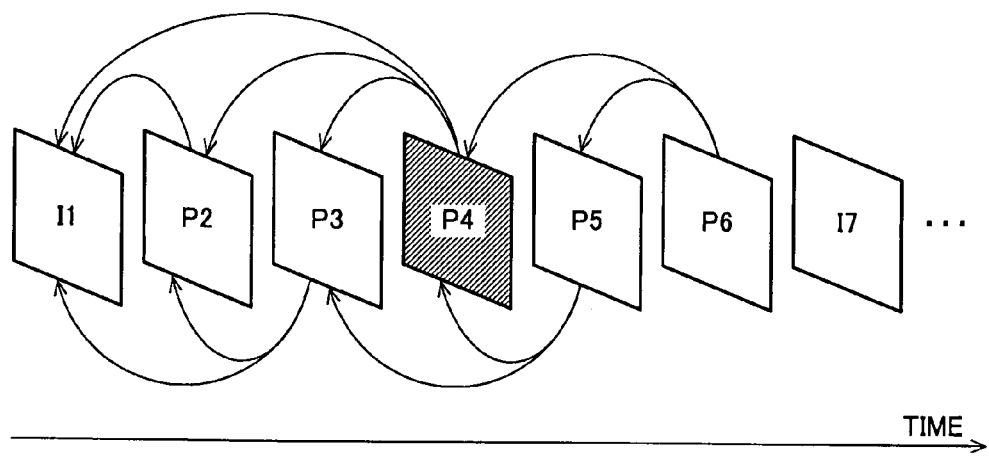

MOVING IMAGE DECODING APPARATUS AND MOVING IMAGE DECODING METHOD

TECHNICAL FIELD

The present invention relates to a moving image decoding apparatus and a moving image decoding method that decode moving image coded data such as MPEG-4, and, more particularly, to a moving image decoding apparatus and a moving image decoding method capable of reproducing video with less deterioration of image quality even in an environment where transmission occurs.

BACKGROUND OF THE INVENTION

Recently, one of moving image coding methods widely used in picturephone systems, video distribution systems (streaming), etc., is the MPEG-4 (Moving Picture Experts Group phase 4). Visual (ISO/IEC 14496-2). The MPEG-4 Visual employs a compression method using prediction in the time direction.

FIG. 9(A) is a diagram showing an example of prediction coding using the MPEG-4 Visual and this example is configured with I-frames (I1 and I7 of FIG. 9(A)) that only use information in an image for coding without any reference image and P-frames (Pn: n=2, 3, 4, 5, and 6 of FIG. 9(A)), each of which is prediction coding using frame that is coded just before the current one as the reference image. For example, the frame P4 is prediction coded using the frame P3 that is coded just before the current one as the reference image.

Recently, an application utilizing a coding method called MPEG-4 AVC (ISO/IEC 14496-10) has been developed. One feature of the MPEG-4 AVC is prediction coding using more than one reference images.

FIG. 9(B) is a diagram showing an example of the prediction coding using the MPEG-4 AVC and this example is configured with I-frames (I1 and I7 of FIG. 9(B)) that only use information in an image for coding without the reference image and P-frames (Pn: n=2, 3, 4, 5, and 6 of FIG. 9(A)) that is prediction coding using one or more of the previously coded frames as the reference images. For example, the frame P4 is prediction coding using the previously coded frame I1, frame P2, and frame P3 as the reference images.

By the way, in an environment where errors are mixed in a communication path, such as a wireless communication, images are not always decoded correctly on a receiving side. Since the prediction coding is used, if an error occurs in one frame, the error is propagated not only to the error occurring frame but also to the subsequent frames. For example, if an error is detected in the frame P4 shaded with the slanting lines in FIG. 9(A), the error is propagated not only to the frame P4 but also to the frame P5 referring to the frame P4 and to the frame P6 referring to the frame P5, and causes the deterioration of image quality. To avoid this, the processes are performed so as not to display the frames with errors (frame P4, frame P5, and frame P6 of FIG. 9(A)) on the receiving side or so as to replace the error portion (error block in frame P4) with another image.

For example, in a method disclosed in the patent document 1 "moving image decoder", if an error is detected in one frame, the coded data is skipped over to the next frame not requiring a reference image.

FIG. 10 is a diagram showing a processing flow when an error occurs in a conventional method, and if an error occurs, a picture header is searched (S31); it is judged whether the picture header is detected (S32); if the picture header is not detected, the search is repeated until the picture header is detected. If the picture header is detected, it is judged whether the picture header is an I-picture (S33). If the picture header is an I-picture, a decoding processing is performed and the processing is terminated (S34). If the picture header is not an I-picture, the processing goes back to S31 to search the next picture header. That is, if an error occurs, the processing is performed to skip over the coded data to detect the next I-picture.

In a method disclosed in patent document title 2 "A method and a device for decoding moving image compression code", if an error is detected in one frame, the frame that is decoded just before the error detected frame is used to perform concealment.

Patent Document 1: Japanese Laid-Open Patent Publication No. 8-149474

Patent Document 2: Japanese Laid-Open Patent Publication No. 9-93589

DISCLOSURE OF THE INVENTION

Problem to be Solved by the Invention

However, if the coded data is skipped over to the next frame not requiring a reference image (frame I7 in the example of FIG. 9(A)) as in the conventional method, it is problematic that the frame (frame P3 in the example of FIG. 9(A)) immediately before the error occurring frame is continuously displayed. In the processing of replacing an error portion with the frame decoded just before the error detected frame, it is problematic that deterioration of image quality becomes noticeable when the correlation is low between the error occurring frame and the frame decoded just before the error frame. In the conventional techniques, the case of more than one reference images is not considered.

The present invention is conceived to solve the above problems and it is therefore the object of the present invention to provide a moving image decoding apparatus and a moving image decoding method that have less deterioration of image quality in the case of occurrence of a transmission error, etc., for a prediction coding method using more than one reference frames.

Means for Solving the Problem

The present invention provides a moving image decoding apparatus that decodes the current image on referring to at least one image of decoded images, comprising a decoding means that decodes input coded data; an image selecting means that selects the image for the concealment from the decoded images and/or the current image using the information of the macro blocks of the current image decoded normally by the decoding means when the decoding means detects an error; and an error concealing means that conceals a portion where the error is detected using the image for the concealment.

The image selecting means counts the number of macro blocks referring to the decoded images among the macro blocks of the current image decoded normally by the decoding means and selects the image that is referred to most frequently as the image for the concealment.

The image selecting means counts the number of intra-macro blocks among the macro blocks of the current image decoded normally by the decoding means and selects the current image as the image for the concealment when the number of the intra-macro blocks is greater than a predetermined threshold.

The image selecting means calculates a degree of pixel correlation between the decoded images and the macro blocks of the current image decoded normally by the decoding means and selects the image with the highest degree of the pixel correlation as the image for the concealment.

The image selecting means calculates a degree of pixel correlation between the decoded images and the macro blocks of the current image decoded normally by the decoding means and selects the current image as the image for the concealment when the degree of the pixel correlation is smaller than a predetermined threshold.

The image selecting means selects the image that is frequently referred to among the decoded images as the image for the concealment.

The image selecting means selects the image corresponding to an identifier having the smallest code amount that identifies the decoded image as the image for the concealment.

The image selecting means discards a picture decoded by the decoding means when the number of macro blocks judged as an error by the decoding means is greater than a predetermined threshold.

The present invention provides a moving image decoding method to decode the current image on referring to at least one image of decoded images, wherein a decoding step for decoding input coded data; an image selecting step for selecting the image for the concealment from the decoded images and/or the current image using the information of the macro blocks of the current image decoded normally at the decoding step when an error is detected at the decoding step; and an error concealing step for concealing a portion where the error is detected using image for the concealment are included.

At the image selecting step, the number of the macro blocks of the current image decoded normally at the decoding step that refer to the decoded images is counted and the image that is most frequently referred to is selected as the image for the concealment.

At the image selecting step, the number of intra-macro blocks of the current image decoded normally at the decoding step is counted and the current image is selected as the image for the concealment when the number of the intra-macro blocks is greater than a predetermined threshold.

At the image selecting step, a degree of pixel correlation between the decoded images and the macro blocks of the current image decoded normally at the decoding step is calculated and the image with the highest degree of the pixel correlation is selected as the image for the concealment.

At the image selecting step, a degree of pixel correlation between the decoded images and the macro blocks of the current image decoded normally at the decoding step is calculated and the current image is selected as the image for the concealment when the degree of the pixel correlation is smaller than a predetermined threshold.

At the image selecting step, the decoded image that is most frequently referred to is selected as the image for the concealment.

At the image selecting step, the image corresponding to an identifier having the smallest code amount that identifies the decoded image is selected as the image for the concealment.

At the image selecting step, a picture decoded at the decoding step is discarded when the number of macro blocks judged as an error at the decoding step is greater than a predetermined threshold.

Effect of the Invention

The present invention can provide a moving image decoding apparatus and a moving image decoding method that have less deterioration of image quality by appropriately selecting the image for the concealment from the images stored in a frame buffer to perform concealment when an error is detected in the process of decoding.

BRIEF DESCRIPTION OF DRAWINGS

FIG. 2 is a diagram showing a configuration of a frame buffer in the first embodiment of the present invention.

FIG. 3 is a diagram for explaining a corresponding relationship between reference indexes and reference images in the first embodiment of the present invention.

FIG. 4 is a diagram for explaining the updated status of the frame buffer in the first embodiment of the present invention.

FIG. 5 is a diagram for explaining the operation of an error correcting unit in the first embodiment of the present invention.

FIG. 9 is a diagram showing an example of prediction coding in MPEG-4.

EXPLANATIONS OF REFERENCE NUMERALS

1 . . . decoding unit; 2 . . . write controlling unit; 3 . . . frame buffer; 4 . . . read controlling unit; 5 . . . displaying unit; 6 . . . error correcting unit; $6_1$ . . . image selecting unit; $6_2$ . . . error concealing unit; 71 . . . macro block; and 72 . . . macro block.

PREFERRED EMBODIMENTS OF THE INVENTION

First Embodiment

Figure 1:
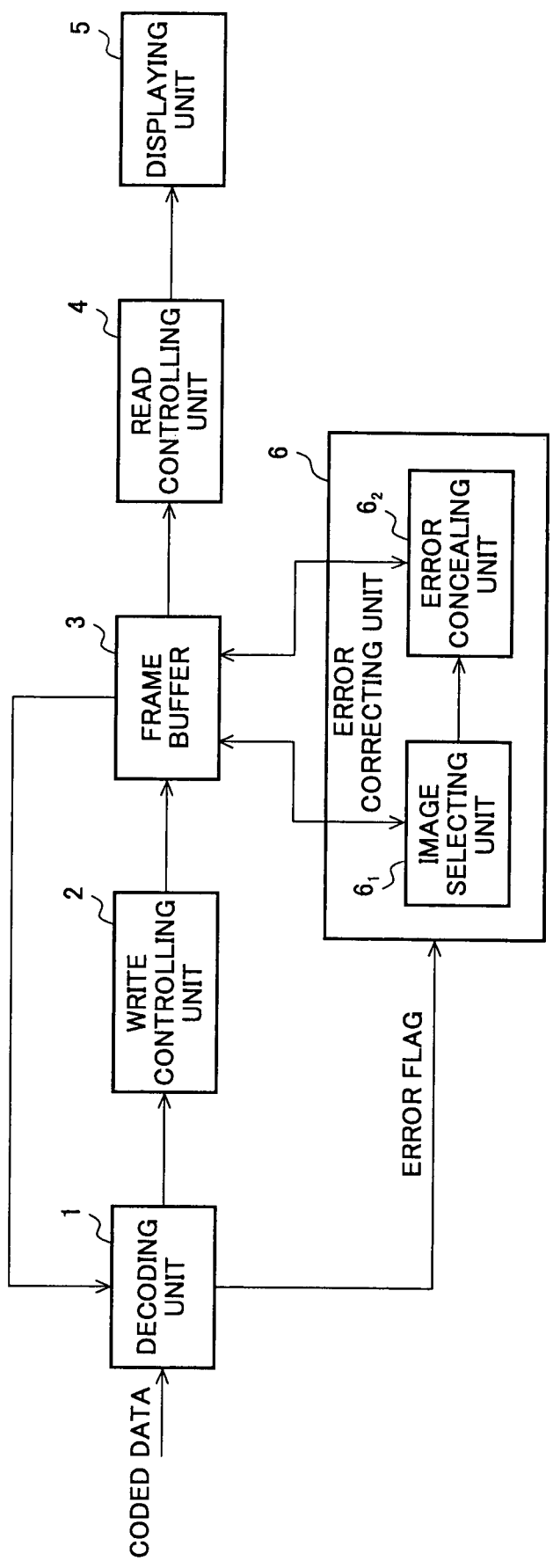
FIG. 1 is a functional block diagram showing a general configuration of a moving image decoding apparatus in the first embodiment of the present invention.

FIG. 1 is a functional block diagram showing a general configuration of a moving image decoding apparatus in the first embodiment of the present invention; a moving image decoding apparatus of the embodiment comprises a decoding unit 1, a write controlling unit 2, a frame buffer 3, a read controlling unit 4, a displaying unit 5, and an error correcting unit 6; and the error correcting unit 6 comprises an image selecting unit $6_1$ and an error concealing unit $6_2$.

FIG. 2(A) is a diagram showing a configuration of the frame buffer 3 shown in FIG. 1, and the frame buffer 3 includes four frame memories for storing an image currently being decoded and decoded images (used as the reference images or waiting to be output) and four additional information memories corresponding to the respective frame memories. The moving image decoding apparatus of the embodiment can use up to three frames as the reference images (the remaining one frame memory is used for storing the image currently being decoded).

FIG. 2(B) is a diagram showing the details of the content of the additional information shown in FIG. 2(A), and the additional information indicates the detailed information of a frame stored in each frame memory and includes a status (status), a frame number (frame_num), and macro block information (mb_info). The macro block indicates a block consisting of 16×16 pixels (which is the same as the definition in the MPEG-4 Visual and MPEG-4 AVC).

The status (status) indicates a state of use of a corresponding frame memory and can have three values, which are UNUSED (unused), USED_FOR_REF (used as a reference image), and USED_FOR_NONREF (used as a non-reference image). The frame number (frame_num) is the information for identifying each frame and can be a positive integer (basically, a frame having a smaller number is displayed earlier).

The macro block information (mb_info) includes a flag (flag), a macro block type (mb_type), a reference index (ref_idx), and a motion vector (mv). For example, in the case of the QCIF (Quarter Common Interface Format) size, the QCIF consists of pixels, and since one block of the macro block is 16×16 pixels, one frame includes 99 (11×9) macro blocks. Therefore, the macro block information (mb_info) for 99 blocks is stored.

The flag (flag) indicates a status of a decoded macro block and can have three values, which are SUCCEEDED (normally decoded), ERROR (error occurs), and CONCEALED (error corrected).

The macro block type (mb_type) indicates a coding type of a macro block and can have two value, which are INTRA_MB (an intra-macro block coded (intra-coded) by only using the information in an image without using for the reference images) and INTER_MB (an inter-macro block prediction coded (inter-coded) by using the reference images).

The reference index (ref_idx) is an identifier indicating which frame is used as the reference image by the macro block and can have three values, which are "0", "1", and "2" (since up to three frames can be used as the reference images in this embodiment).

A reference image list indicating a corresponding relationship between reference indexes and reference images is described. The reference image list is basically determined immediately after the decoding of the head (a slice header) of a slice (a collection of macro blocks) that forms a frame.

FIG. 3 is a diagram showing the reference image list immediately after the slice header of the frame P4 in FIG. 9(B) is decoded. In an example of FIG. 3(A), ref_idx=0, ref_idx=1, and ref_idx=2 indicate that the reference images are the frame P3, frame P2, and frame I1, respectively. In an example of FIG. 3(B), ref_idx=0, ref_idx=1, and ref_idx=2 indicate that reference images are the frame I1, frame P3, and frame P2, respectively.

In the case of the MPEG-4 AVC, the ref_idx value is coded for each prediction block (macro block, etc.) and a shorter code is allocated to a smaller ref_idx value. Therefore, the reference image list is updated on a slice-to-slice basis so that the image which is most frequently referred to has ref_idx=0. Although a smaller ref_idx value is typically assigned to a decoded image closer to the current image in the display order (FIG. 3(A)), when it is judged on the coding side that the image decoded several frames before is appropriate for the reference image, ref_idx=0 may be assigned to the image decoded several frames before instead of the image decoded just before the current one (FIG. 3(B)).

The motion vector (mv) is the information representing a motion vector at the time of motion compensation. The accuracy of the motion vector value is not particularly limited and may be any values such as one pixel accuracy, ½ pixel accuracy, and ¼ pixel accuracy. The reference index (ref_idx) and the motion vector (mv) are effective only when the macro block type (mb_type) is INTER_MB.

Although the reference index (ref_idx) and the motion vector (mv) are provided as the additional information for each macro block (16×16 pixels), the reference index (ref_idx) and the motion vector (mv) may be provided for smaller units, for example, macro block division units (16×16 pixels, 16×8 pixels, 8×16 pixels, 8×8 pixels) or sub-macro block division units (8×4 pixels, 4×8 pixels, 4×4 pixels) of the MPEG-4 AVC. Operation of each unit is described below.

In FIG. 1, the decoding unit 1 performs variable-length decoding, inverse quantization, inverse transformation, motion compensation, etc., on the input coded data and outputs the decoded image of one frame, the frame number (frame_num), and the macro block information (mb_info) to the write controlling unit 2. If the decoded image is the necessary P-frame, etc., the corresponding image is input to the decoding unit 1 from the frame buffer and utilized for decoding. The decoding unit 1 informs the error correcting unit 6 of an error flag (0: no error, 1: error exists) indicating whether an error occurs in the process of decoding. The error is generated when a codeword not existing in a variable-length decoding table is detected, when the decoded result exceeds a specified range, when an inconsistency is detected in a decoded value, etc.

The write controlling unit 2 checks the status of each frame memory of the frame buffer 3 and selects the frame memory in the unused status (status=UNUSED) to write the decoded image, the frame number (frame_num), and the macro block information (mb_info) input from the decoding unit 1. The frame memory used for the writing is changed to the status=USED_FOR_REF (used for the reference image) or the status=USED_FOR_NONREF (used for the non-reference image). If no frame memory is in the unused status, the writing is performed after the read controlling unit 4 outputs one frame of data to the displaying unit 5 to make the frame memory available.

The read controlling unit 4 checks the status of each frame memory of the frame buffer 3 and selects the frame memory with the smallest frame number and outputs it to the displaying unit 5 if no frame memory is in the unused status (status=UNUSED). The status of that frame memory is switched into the status=UNUSED.

The displaying unit 5 comprises an LCD display, a display buffer, etc., and displays the decoded image output from the read controlling unit 4.

FIG. 4 is a diagram for explaining the update status of the frame buffer 3 and FIG. 4 is a diagram showing the status of the frame buffer 3 at the time of decoding of the frame P4 and frame P5 of FIG. 9(B).

FIG. 4(A) is a diagram showing the status of the frame buffer 3 at the start of decoding of the frame P4, and the frame memory 1, the frame memory 2, and the frame memory 3 are in the status=USED_FOR_REF (used for a reference image) and store the decoded image I1, the decoded image P2, and the decoded image P3, respectively. At the start of decoding of the frame P4, the write controlling unit 2 checks the status of the frame buffer and sets the frame memory 4 in the status=UNUSED as the destination that the next decoded image is to be written in. The frame P4 decoded by the decoding unit 1 is written into the frame memory 4, and the status of the frame memory 4 is switched into the status=USED_FOR_REF.

FIG. 4(B) is a diagram showing the status of the frame buffer 3 at the time of completion of decoding of the frame P4, and the read controlling unit 4 checks the status of the frame buffer 3 at the time of completion of decoding of the frame P4, outputs the decoded image I1 having the smallest frame number (frame_num=1) stored in the frame memory 1 to the displaying unit 5 since no frame memory is in the status=UNUSED, and switches the status of the frame memory 1 into the status=UNUSED.

FIG. 4(C) is a diagram showing the status of the frame buffer 3 at the start of decoding of the frame P5, and the write controlling unit 2 sets the frame memory 1 in the status=UNUSED as the destination that the next decoding image is to be written in. The frame P5 decoded in the decoding unit 1 is written into the frame memory 1, and the status of the frame memory 1 is switched into the status=USED_FOR_REF.

The error correcting unit 6 is explained as below. The error correcting unit 6 comprises the image selecting unit 6$_1$ and the error concealing unit 6$_2$, and works when the error flag communicated from the decoding unit 1 is "1", but does nothing in the case of "0".

The image selecting unit 6$_1$ refers to the additional information stored in the frame buffer 3 to select the frame which is used as the image for a concealment and notifies the error concealing unit 6$_2$ of the frame number (frame_num) of the selected image or the frame memory number of the frame memory that stores the selected image as the selected frame information. The error concealing unit 6$_2$ performs a concealment processing to the macro block in which an error occurred using the additional information and the selected frame information communicated from the image selecting unit 6$_1$.

It is explained as below that how the error correcting unit 6 operates when an error is detected in the process of decoding of the frame P4 shaded with the slanting lines of FIG. 9(B). The status of the frame buffer 3 is as shown in FIG. 4(B) and the reference image list is as shown in FIG. 3(A).

FIG. 5 is a diagram showing the decoding result of each macro block of the frame P4. The image size is the QCIF (176×144 pixels). Therefore, since one block of the macro block has 16×16 pixels, the frame P4 has 11×9 that is 99 macro blocks in total.

"X" indicates an intra-macro block (a macro block satisfying mb_info.flag=SUCCEEDED and mb_info.mb_type=INTRA_MB) that is intra-coded (coded by only using the information in a picture without the reference images) among the normally decoded macro blocks. "0" indicates an inter-macro block (mb_info.flag=SUCCEEDED and mb_info.mb_type=INTER_MB and mb_info.ref_idx=0) that uses the frame P3 as the reference image among the normally decoded macro blocks. Similarly, "1" indicates an inter-macro block (mb_info.flag=SUCCEEDED and mb_info.mb_type=INTER_MB and mb_info.ref_idx=1) that uses the frame P2 as the reference image, and "2" indicates an inter-macro block (mb_info.flag=SUCCEEDED and mb_info.mb_type=INTER_MB and mb_info.ref_idx=2) that uses the frame I1 as the reference image.

"E" indicates a macro block (macro block satisfying mb_info.flag=ERROR) that an error occurred in the process of decoding.

The image selecting unit 6$_1$ counts the number nI of the intra-macro blocks ("X" of FIG. 5) in the frame P4, the number n0 of the inter-macro blocks ("0" of FIG. 5) referring to the frame P3, the number n1 of the inter-macro blocks ("1" of FIG. 5) referring to the frame P2, the number n2 of the inter-macro blocks ("2" of FIG. 5) referring to the frame I1, and the number nE of the error macro blocks ("E" of FIG. 5).

The frame corresponding to n satisfying the following equation (1) is selected as the image for the concealment, and the error concealing unit 6$_2$ is informed of the frame number (frame_num) of the selected image or of the frame memory number of the frame memory storing the selected image as the selected frame information.

$$n = \mathrm{MAX}(n0, n1, n2) \qquad \text{equation (1)}$$

Since n=n0 (the number of "0" is the maximum) in the frame P4, the error concealing unit 6$_2$ is informed of frame_num=3 of the frame P3 corresponding to n0 or of the frame memory number=3 as the selected frame information.

By selecting the frame that is most frequently referred to as the image for the concealment in this way, the motion vector decoded with the frame P4 can be utilized to perform the concealment appropriately and to make the deterioration of image quality less noticeable.

By handling the intra-macro blocks coded by only using the information in a picture without the reference images in the same way as the macro blocks of ref_idx=0 referring to the frame P3, the frame corresponding to n satisfying the following equation (2) may be selected as the image for the concealment.

$$n = \mathrm{MAX}(nI + n0, n1, n2) \qquad \text{equation (2)}$$

If the number nI of the intra-macro blocks is greater than a predetermined threshold T1 (nI>T1), the current image (frame P4) may be selected as the image for the concealment. For example, if a scene change occurs in the frame P4 and many intra-macro blocks are generated, this can prevent the image quality from deteriorating due to using a different scene as the image for the concealment.

If the number nE of the error macro blocks is greater than a predetermined threshold T2 (nE>T2), the frame may be discarded without performing the concealment. This can prevent the image quality from deteriorating due to displaying a frame including an extremely large number of errors.

If the macro blocks around the error macro blocks refer to a frame different from the frame (frame P3) obtained from equation (1) or equation (2), the different frame may be selected as the image for the concealment. Since most of the macro blocks around the error macro blocks shown by "E" are "1" and refer to the frame P2 in the example of FIG. 5, the frame P2 is selected instead of the frame P3 as the image for the concealment.

Alternatively, instead of using all the macro blocks satisfying mb_info.flag=SUCCEEDED as the objects of obtaining n0, n1, and n2, only the macro blocks around the error macro block may be used. For example, only eight macro blocks (at the upper, the upper right, the right, the lower right, the lower, the lower left, the left, and the upper left) adjacent to the error block maybe used as the objects or when the macro block address of the error macro block is $(x_0, y_0)$, only a macro block $(x,y)$ satisfying $|x-x_0|<dx$ and $|y-y_0|<dy$ (where dx and dy are constant numbers) may be used as the object. The concealment can appropriately be performed in this way if an error occurs in a macro block referring to a frame that precedes several frames because of the occlusion (hiding a back object with a front object (see FIG. 6)), etc.

Figure 6:
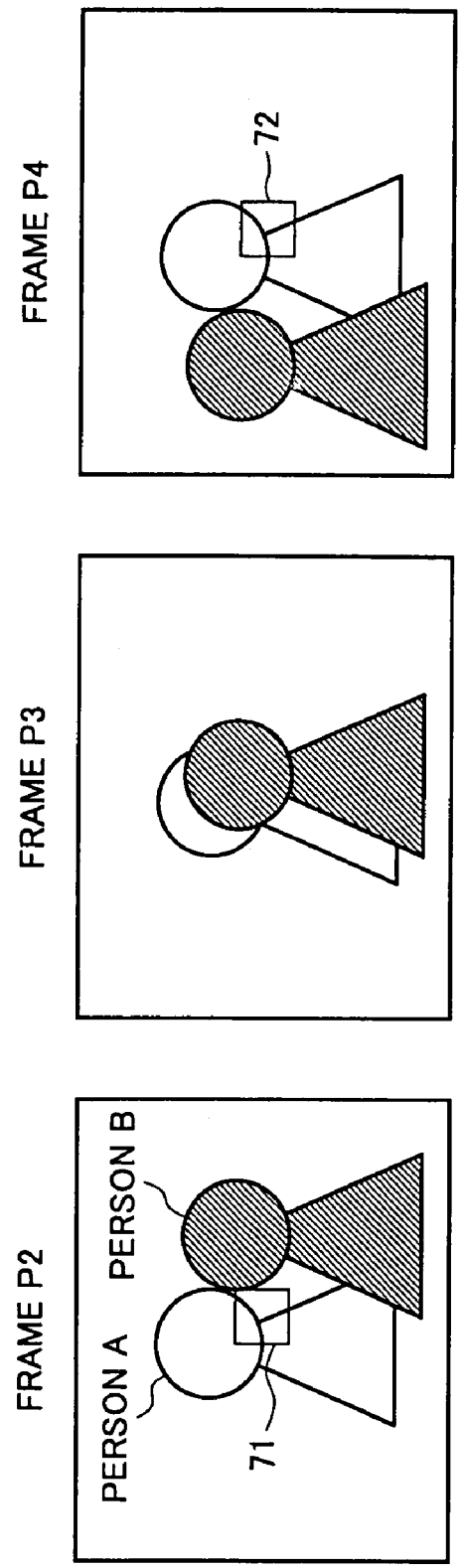
FIG. 6 is a diagram for explaining the operation of the error correcting unit in the first embodiment of the present invention.

FIG. 6 is a diagram showing an example of the occlusion and shows a situation when a person B passes in front of a person A from the frame P2 to frame P4. When a macro block 72 in the frame P4 is coded, the corresponding portion is hidden behind the person B in the frame P3 and, therefore, the macro blocks around the macro block 72 including itself are likely to use the frame P2 as the reference image (a portion corresponding to the macro block 71) instead of using the frame P3 as the reference image. Therefore, if an error occurs in the macro block 72, the concealment can be performed more appropriately when the frame P2 is selected as the image for the concealment.

By combining the above methods, the image for the concealment obtained from the information of the entire frame and the image for the concealment obtained from the information of the macro blocks around the block 72 may be switched for each error macro block.

In FIG. 1, the error concealing unit $6_2$ corrects the error occurring macro block of the frame P4 based on the selected frame information communicated from the image selecting unit $6_1$ and the additional information stored in the frame buffer 3. For example, an image located at the same position as that of the error occurring block is copied from the image for the concealment.

Alternatively, a motion vector (mv_global) of the entire frame may be obtained from the following equation (3) using the average value of the motion vectors of the normally decoded inter-macro blocks (mb_info.flag=SUCCEEDED and mb_info.mb_type=INTER_MB) in the frame P4, and an error may be concealed with the image acquired by performing the motion compensation from the image for the concealment using mv_global.

$$\text{mv\_global} = \frac{\sum_i \text{mb\_info}[i] \cdot mv}{n0 + n1 + n2} \quad \text{equation (3)}$$

all $i$ satisfying mb_info[$i$].flag = SUCCEEDED
and mb_info[$i$].mb_type = INTER_MB Alternatively, a local motion vector (mv_local) may be obtained from the average value of the motion vectors of the inter-macro blocks, which are normally decoded, around the error macro block (adjacent macro blocks, adjacent slices, etc.), and an error may be concealed with the image acquired by performing the motion compensation from the image for the concealment using the obtained mv_local.

Alternatively, if the motion vector can normally be decoded while an error occurs in a macro block at the time of utilizing the data partition in the MPEG-4 or if the decoded value of the motion vector is credible while the data partition is not utilized, the motion vector of the error macro block may directly be utilized.

When the current image is selected as the image for the concealment, an error may be concealed, for example, by copying pixel values of the macro blocks, that can normally be decoded around the error block.

Finally, the macro block information of the corrected macro block is updated (flag=CONCEALED).

Figure 7:
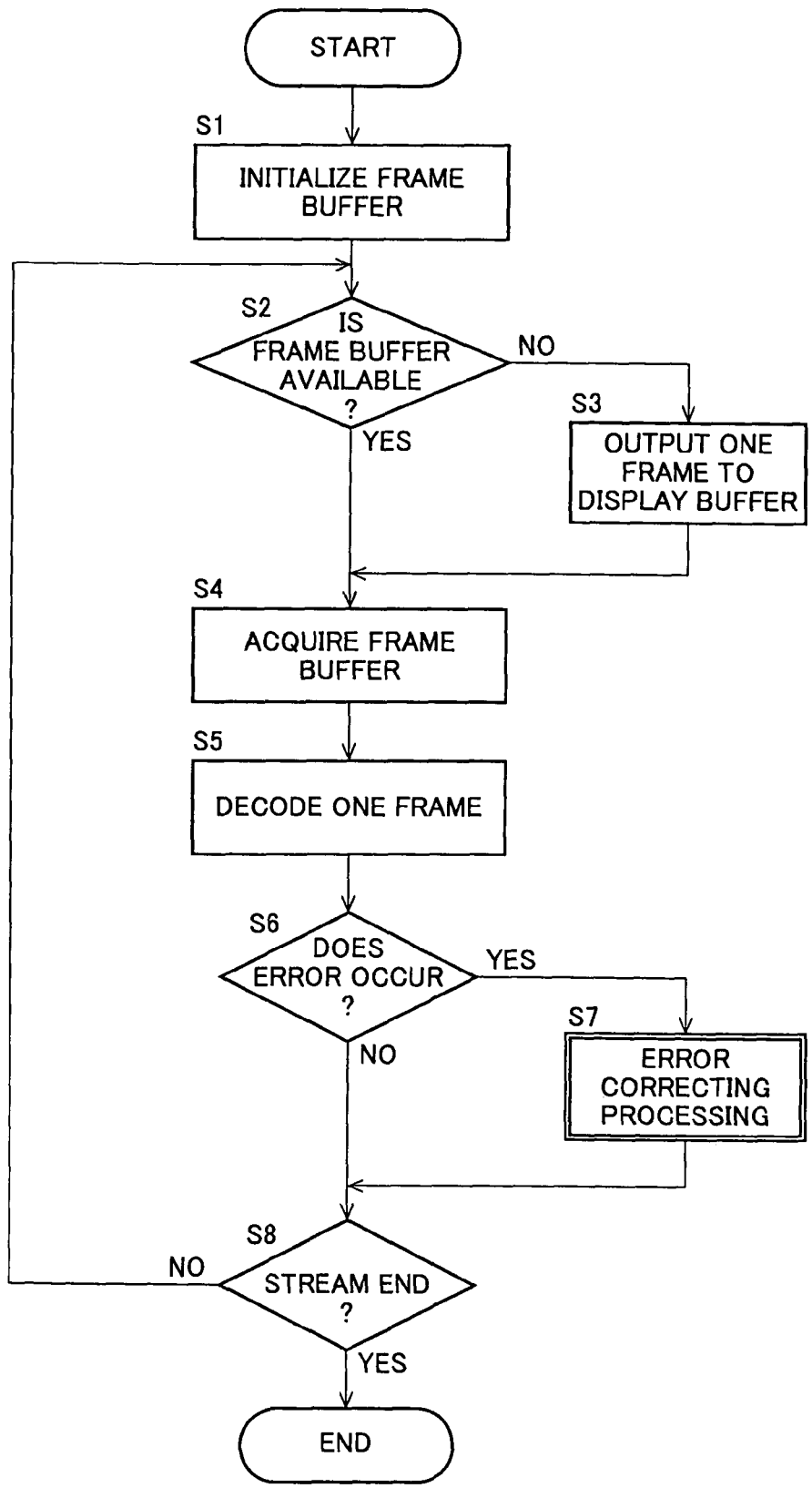
FIG. 7 is a processing flow diagram of a moving image decoding method in the first embodiment of the present invention.

FIG. 7 is a processing flow diagram of a moving image decoding method of the first embodiment of the present invention.

At step S1, the frame buffer is initialized. Specifically, the necessary memories are ensured and the status of the frame memories are initialized (all are in the unused statuses, i.e., status=UNUSED).

At step S2, it is checked whether the frame buffer is available and the process goes to step s4 if available (there are some frame memories in the status=UNUSED) or goes to step if not available (no frame memory is in the status=UNUSED).

At step S3, the oldest one in the display order (one with the smallest frame number) of the decoded images stored in the frame buffer, is output to the display buffer and then the status of the outputting frame memory is switched into the unused status (status=UNUSED), and the process goes to step S4.

At step S4, the frame memory in the unused status (status=UNUSED) is acquired for a storage of the image to be decoded, and the process goes to step S5.

At step S5, one frame of the coded data is decoded, the decoded image is stored in the frame buffer ensured at step S4, and if an error occurs in the process of decoding, the error flag is set to "1".

At step S6, the process goes to step S7 if an error occurs (error flag="1") or goes to step S8 if an error does not occur (error flag="0").

At step S7, a concealment processing is performed for the error occurring portion, and the process goes to step S8.

At step S8, if the coded data are still continued, the process goes back to step S2 and the processing is continued, and if the coded data are terminated, the entire processing is finished.

Figure 8:
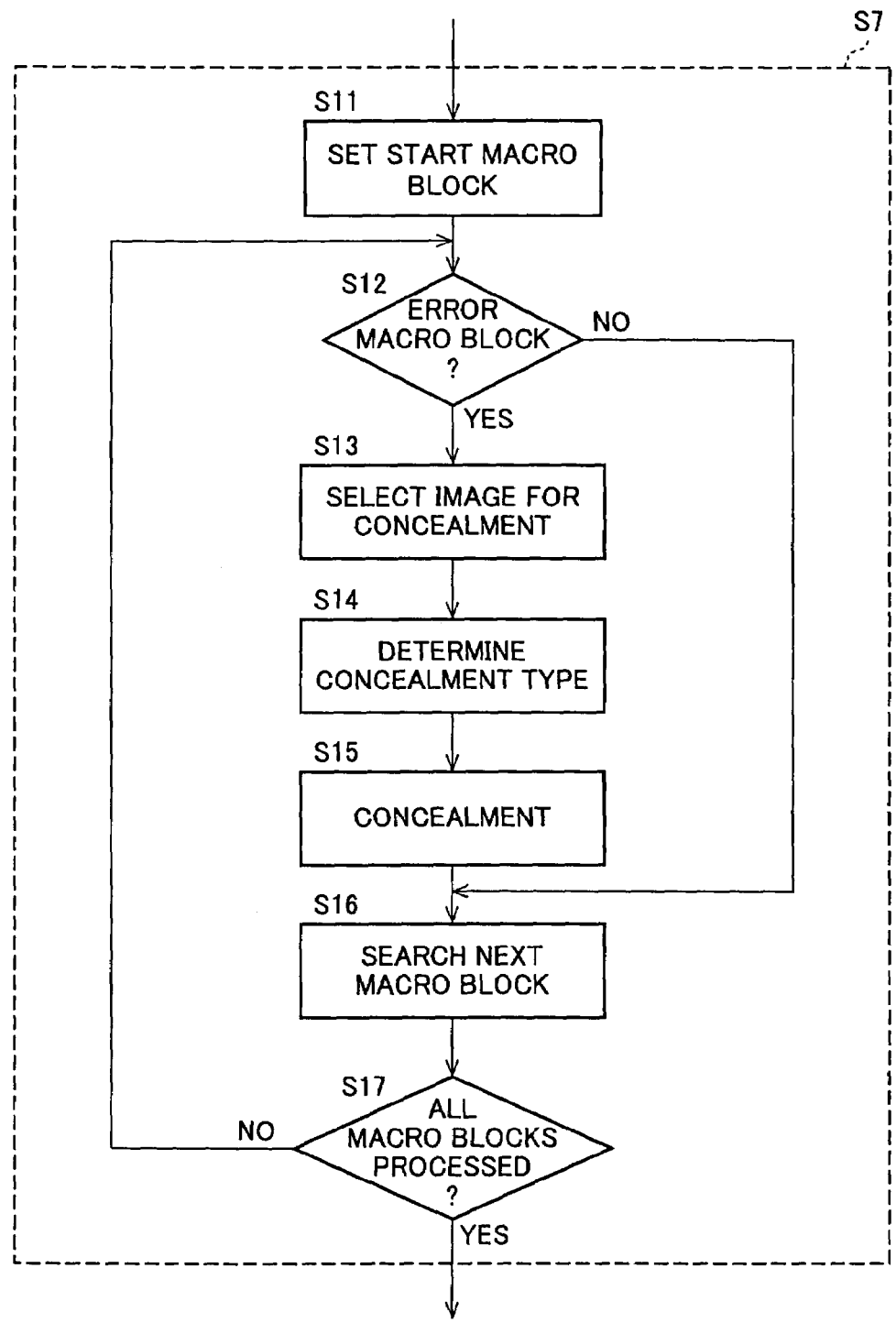
FIG. 8 is a processing flow diagram of the error correcting process in the first embodiment of the present invention.
Figure 10:
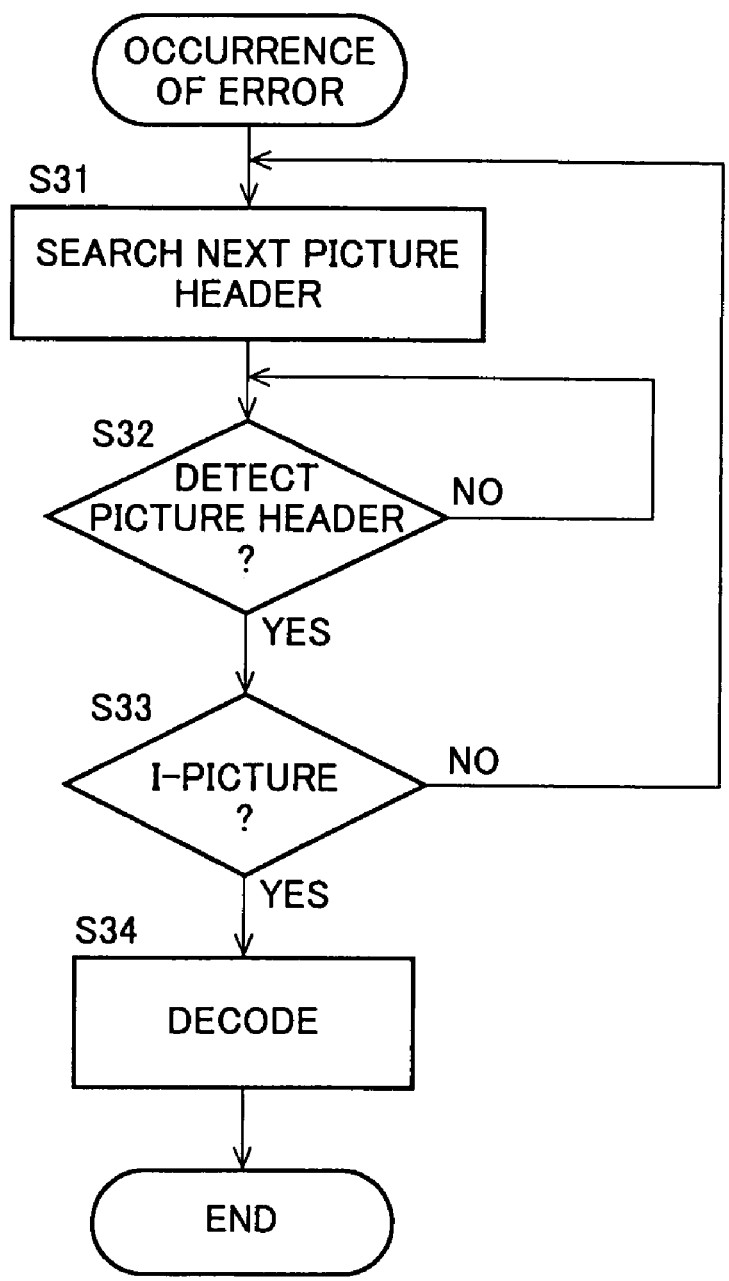
FIG. 10 is a diagram showing a processing flow when an error occurs in a conventional method.

FIG. 8 is a process flow diagram showing the details of step S7.

At step S11, a start macro block is set to perform the error concealing processing.

At step S12, it is judged if an object macro block includes an error. Whether an error is included or not can be judged from the flag (flag) of the macro block information stored in the frame buffer. The process goes to step S13 if the object macro block is the error macro block (flag=ERROR) and goes to step S16 if the object macro block is not the error macro block (flag≠ERROR).

At step S13, the image for the concealment for the object macro block is selected from the images stored in the frame buffer and the process goes to step S14.

At step S14, a concealment type (e.g., copying an image located at the same position as that of the image selected at step S13, copying an image that is motion-compensated based on the motion vector, or copying the pixels around the current image) is decided, and the process goes to step S15.

At step S15, the concealment processing is actually performed, the macro block information is updated (flag=CONCEALED), and the process goes to step S16.

At step S16, the next macro block to be processed is searched, and the process goes to step S17.

At step S17, if the next macro block to be processed exists, the process goes back to step S12 and the processing is continued. If the next macro block to be processed does not exist, the processing is finished and the process goes to step S8.

Although it is generally considered that the macro blocks are set and searched from the upper left macro block of the image in the order of the raster scan at step S11 and step S16, it is possible to set and search the macro blocks in any order without limited to this method.

Second Embodiment

A second embodiment of the present invention is described below. A structure of the moving image decoding apparatus according to this embodiment is as shown in FIG. 1 and only the image selecting unit $6_1$ is operated differently from that of the first embodiment. It is explained below that how the image selecting unit $6_1$ works when an error is detected in the process of the decoding of the frame P4 shaded with the slanting lines of FIG. 9(B). The status of the frame buffer 3 is as shown in FIG. 4(B).

The image selecting unit $6_1$ counts the number nS of the normally decoded macro blocks (mb_info.flag=SUCCEEDED) and the number nE of the error macro blocks (mb_info.flag=ERROR) in the frame P4.

The following equation (4) is used to obtain a differential absolute sum sad(x) between the current image (frame P4) and the already decoded images (frame P3, frame P2, and frame I1). In equation (4), curr(i,j) is a pixel value at the coordinates(i,j) of the current image and prev(i,j) is a pixel value at the coordinates(i,j) of the already decoded image. However, only the macro blocks (mb_info.flag=SUCCEEDED) normally decoded in the current image (frame P4) is used for the calculation of sad(x). The sum of the differential absolute values between the frame P4 and the frame P3 is sad(1), the sum of the differential absolute values between the frame P4 and the frame P2 is sad(2), and the sum of the differential absolute values between the frame P4 and the frame I1 is sad(3).

$$\text{sad}(x) = \sum_{i,j} |curr(i,j) - perv(i,j)| \qquad \text{equation (4)}$$

for all pixels(i,j) belonging to the macro blocks satisfying mb_info.flag=SUCCEEDED The frame corresponding to the sad satisfying the equation (5), namely, the frame with the highest degree of correlation is selected as the image for the concealment, and the error concealing unit $6_2$ is informed of the frame number (frame_num) of the selected image or of the frame memory number of the frame memory storing the selected image as the selected frame information.

$$\text{sad} = \text{MIN}(\text{sad}(1), \text{sad}(2), \text{sad}(3)) \qquad \text{equation (5)}$$

By selecting the frame with the highest degree of correlation as the image for the concealment in this way, the appropriate concealment can be performed in consideration of scene changes, flashes of screen, etc., and the deterioration of image quality can be made less noticeable.

Although the differential absolute sum is used for calculation of the degree of correlation, another method, for example, the differential square sum (equation (6) and equation (7)) is possibly used.

$$\text{ssd}(x) = \sum_{i,j} (curr(i,j) - perv(i,j))^2 \qquad \text{equation (6)}$$

for all pixels (i,j) belonging to macro blocks satisfying mb_info.flag=SUCCEEDED $$\text{ssd} = \text{MIN}(\text{ssd}(1), \text{ssd}(2), \text{ssd}(3)) \qquad \text{equation (7)}$$

If sad(x) becomes smaller than the predetermined threshold T3 in the course of calculation of sad(1), sad(2), and sad(3) (sad(k)<T3, where k=1 or 2 or 3), the subsequent sad calculations may be omitted to select the frame corresponding to sad(k) as the image for the concealment. In this way, the more appropriate image for the concealment can be selected with a smaller processing amount.

If the sad is larger than predetermined threshold T4 (sad>T4), the current image (frame P4) may be selected as the image for the concealment. For example, if a scene change occurs in the frame P4, this can prevent the image quality from deteriorating due to using a different scene as the image for the concealment.

If the number nE of the error macro blocks is larger than the predetermined threshold T5 (nE>T5), the frame may be discarded without performing the concealment. This can prevent the image quality from deteriorating due to displaying a frame including an extremely large number of errors.

The image for the concealment may be determined in combination with n used in the first embodiment. For example, if the scatters of n0, n1, and n2 are small in the equation (1) of the first embodiment, the image for the concealment may be determined using sad or ssd. Alternatively, the frame that maximizes a value y obtained from equation (8) or equation (9) may be selected as the image for the concealment. $\alpha$ and $\beta$ are values determined empirically and satisfy $\alpha > 0$ and $\beta > 0$.

$$y = \alpha \cdot n - \beta \cdot \text{sad} \qquad \text{equation (8)}$$

$$y = \alpha \cdot n - \beta \cdot \text{ssd} \qquad \text{equation (9)}$$

In this way, the more appropriate image for the concealment can be selected and the deterioration of image quality can be made less noticeable.

Instead of using all the macro blocks satisfying mb_info.flag=SUCCEEDED as the objects for obtaining sad (x) using equation (4), only the macro blocks around the error macro block (e.g., eight adjacent macro blocks) may be used in the same manner as shown in the first embodiment. With this method, the concealment can appropriately be performed if an error occurs in a macro block referring to a frame that precedes several frames because of the occlusion, etc.

By combining the method described above, the image for the concealment obtained from the information of the entire frame and the image for the concealment obtained from the information of the macro blocks around the error block may be switched for each error macro block.

Third Embodiment

A third embodiment of the present invention is described below. A structure of the moving image decoding apparatus according to this embodiment is as shown in FIG. 1 and only the image selecting unit $6_1$ is operated differently from that of the first embodiment. It is explained below that how the image selecting unit $6_1$ works when an error is detected in the process of the decoding of the frame P4 shaded with the slanting lines of FIG. 9(B). The status of the frame buffer 3 is as shown in FIG. 4(B).

The image selecting unit $6_1$ according to this embodiment selects an image with the reference index ref_idx=0 from the reference image list as the image for the concealment and informs the error concealing unit $6_2$ of the frame number (frame_num) of the selected image or of the frame memory number of the frame memory storing the selected image as the selected frame information. For example, if the reference image list is that shown in FIG. 3(A), the frame P3 with ref_idx=0 is selected as the image for the concealment. If the reference image list is that shown in FIG. 3(B), the frame I1 is selected as the image for the concealment.

In the reference image list of the slice with an error detected, the reference image corresponding to ref_idx=0 is the image that is most frequently referred to in the slice. As described in the case of first embodiment, this is because the reference image list is updated so that ref_idx=0 is assigned to the image that is most likely selected as the reference image (the image with a small prediction error, etc.) to control the amount of generated codes.

If the reference image list of the slice with an error detected is not available (such as when an error is detected in a slice header), the reference image list of the slice that is decoded just before the current one may be utilized.

As a result, the appropriate image for the concealment can be selected without complicated calculations and the deterioration of image quality can be made less noticeable. The image quality can be prevented from deteriorating when the concealment from the frame that is just before the current one is inappropriate because of the occlusion (see FIG. 6). Since the image with the smallest prediction error is usually selected as the reference image with ref_idx=0 on the coding side, the appropriate concealment can be performed with less deterioration of image quality by selecting the reference image with ref_idx=0 as the image for the concealment even when the occlusion, etc., are occurred.

Although an example of correcting errors on a frame-to-frame basis is shown in this embodiment, the similar method can be used on a field-to-field basis.

Although in this embodiment, the frame memories of "the maximum number of the reference images (3)+1" are ensured in the frame buffer and any one of the reference images is selected as the image for the concealment, more frame memories may be ensured in the case of an environment with enough resources, etc., and not only the reference images but also the images remaining in the frame buffer for waiting to be displayed may be selected as the image for the concealment.

Although in this embodiment, the flag (flag=CONCEALED) is set for an error-corrected macro block to indicate that an error is corrected, the macro block with flag=CONCEALED may not be utilized when the error correcting processing is performed in subsequent frames.

The invention claimed is:

1. A moving image decoding apparatus which decodes a current image on referring to at least one image of more than one decoded images, comprising:
   a decoding unit for decoding input coded data,
   an image selecting unit for counting a number of macro blocks on referring to the decoded images among macro blocks of the current image decoded normally by the decoding unit if the decoding unit detects an error and selecting an image with the highest number of references as the image for the concealment, and
   an error concealing unit for performing the concealment of a portion where the error is detected using the image for the concealment.

2. A moving image decoding apparatus which decodes a current image on referring to at least one image of more than one decoded images, comprising:
   a decoding unit for decoding input coded data,
   an image selecting unit for counting a number of intra-macro blocks among the macro blocks of the current image decoded normally by the decoding unit if the decoding unit detects an error and selecting the current image as the image for the concealment if the number of the intra-macro blocks is greater than a predetermined threshold, and
   an error concealing unit for performing the concealment of a portion where the error is detected using the image for the concealment.

3. A moving image decoding apparatus which decodes a current image on referring to at least one image of more than one decoded images, comprising:
   a decoding unit for decoding input coded data,
   an image selecting unit for selecting an image that is most frequently referred to from the decoded images as the image for the concealment if the decoding unit detects an error; and
   an error concealing unit for performing the concealment of a portion where the error is detected using the image for the concealment.

4. A moving image decoding apparatus which decodes a current image on referring to at least one image of more than one decoded images, comprising:
   a decoding unit for decoding input coded data,
   an image selecting unit for selecting an image corresponding to an identifier having the smallest code amount that identifies the decoded image as the image for the concealment if the decoding unit detects an error, and
   an error concealing unit for performing the concealment of a portion where the error is detected using the image for the concealment.

5. The moving image decoding apparatus according to any one of claims 1 to 4, wherein the image selecting unit discards a picture decoded by the decoding unit if the number of macro blocks determined as an error by the decoding unit is greater than a predetermined threshold.

* * * * *